Nov. 9, 1948.  E. W. VARS  2,453,556
ADJUSTABLE DRAWBAR AND ADJUSTABLE MOUNTING THEREFOR
Filed Aug. 29, 1946
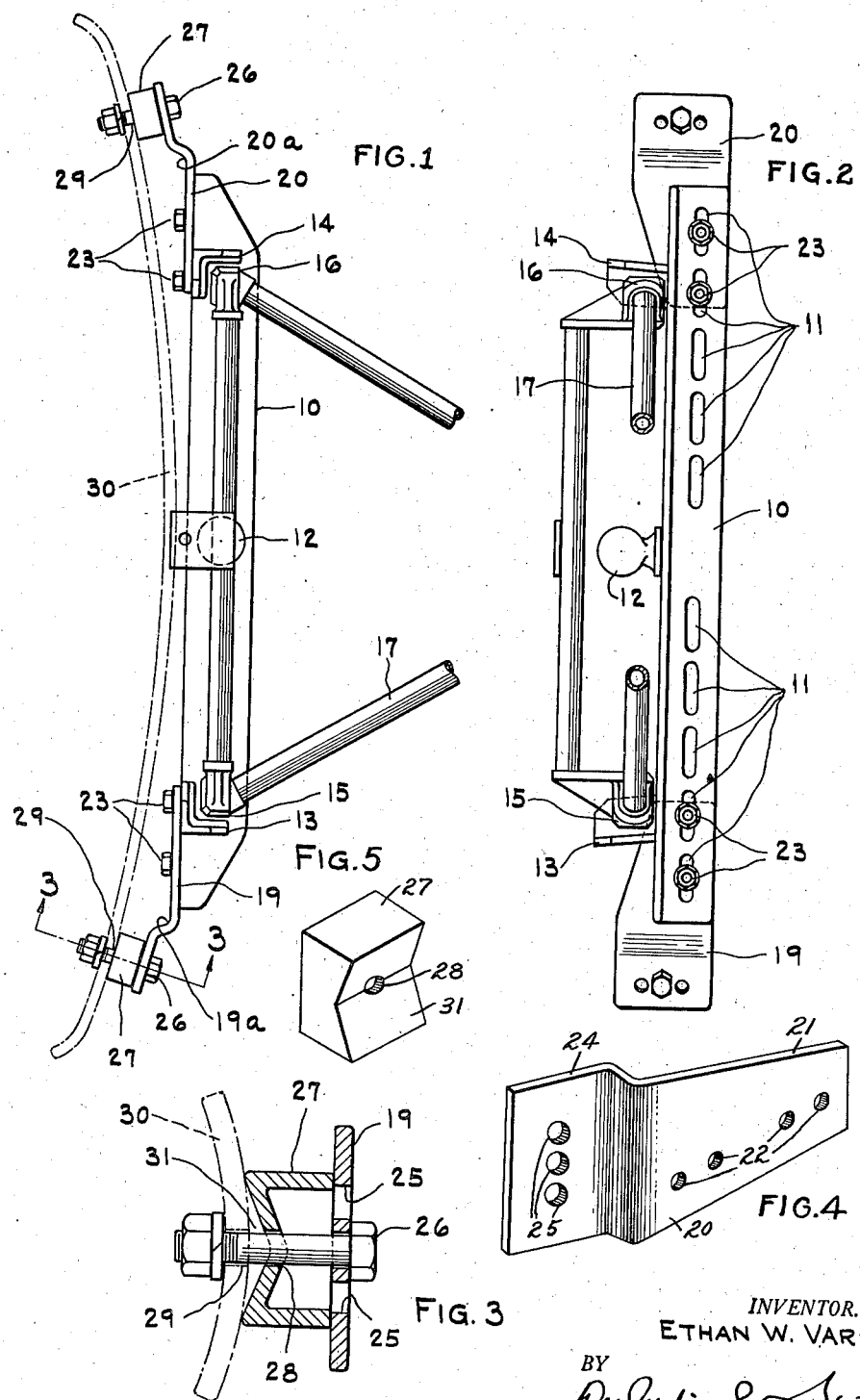
INVENTOR.
ETHAN W. VARS
BY
HIS ATTORNEYS Patented Nov. 9, 1948

2,453,556

UNITED STATES PATENT OFFICE 2,453,556

ADJUSTABLE DRAWBAR AND ADJUSTABLE MOUNTING THEREFOR

Ethan W. Vars, Duncannon, Pa., assignor, by mesne assignments, to George Harold Bell & Associates, York, Pa., a partnership Application August 29, 1946, Serial No. 693,717

11 Claims. (Cl. 280—33.14)

My invention relates to an adjustable drawbar and adjustable mounting therefor, adapted to be positioned on the rear of a tractor vehicle to receive a trailer hitch mechanism.

This invention is particularly adapted for use with the single tongue type of trailer hitch shown in my copending applications for United States Letters Patent, Serial No. 648,591, filed February 19, 1946, and Serial No. 679,227, filed June 25, 1946, now Patent No. 2,432,357, issued Dec. 9, 1947, and for mounting on tractor vehicles having a rear bumper.

In order to hitch trailers to tractor vehicles horizontal centering of the draw point and alignment of the tongue parallel to the ground is desirable and therefore I have devised a mounting and drawbar which is adjustable so as to cooperate with most combinations of trailer and tractor dimensions to achieve such centering and alignment.

The principal object of my invention is to provide an adjustable mounting and cooperating drawbar which is adapted to be fitted to various sizes and styles of bumpers on tractor vehicles, in particular to bumpers as provided on the various makes of automobiles, and which is further adjustable so as to cooperate with various tongue heights of trailer vehicles.

Another object of my invention is to provide mounting plates for a drawbar, which plates may be vertically adjusted on the tractor vehicle, and to provide a cooperating drawbar fastenable thereto regardless of possible wide variations of the interspace between the mountings.

Further objects, and objects relating to the details of construction and economies of operation will definitely appear from the detailed description to follow. In one instance, I have accomplished the objects of my invention by the devices and means set forth in the following specification. My invention is clearly defined and pointed out in the appended claims. Structures, constituting the preferred embodiment of my invention are illustrated in the accompanying drawings forming a part of this specification, in which:

Fig. 1 is a plan view of my adjustable mounting and drawbar, shown connected to the bumper of a tractor vehicle, Fig. 2 is a view in side elevation of the substance of Fig. 1, Fig. 3 is a detail, sectional view taken along the line 3—3 of Fig. 1, Fig. 4 is a detail view in perspective of one of the adjustable mounting plates of my invention, and Fig. 5 is a detail view in perspective of one of the mounting blocks.

In the drawings the same reference numerals refer to the same parts throughout the several views and the sectional view is taken looking in the direction of the arrows at the ends of the section line.

My novel device includes a drawbar to be disposed in horizontal position across the rear end of the tractor vehicle to the rear of the rear horizontal bumper. It has been found that, inasmuch as tractor vehicles vary in the positioning of their bumpers above ground level and that trailers vary in the height of the tongue when in level running position, it is desirable to have the drawbar adjustably attachable to the tractor vehicle to compensate for these variations. Moreover, since the rear bumpers of various vehicles are provided with horizontally disposed bolts and bolt holes that may be used to fasten the drawbar to the bumper, and since these holes in different bumpers are spaced differently horizontally, I provide mounting plates with a plurality of holes vertically spaced and a plurality of holes horizontally spaced, whereby both vertical and horizontal disposition of the drawbar may be made. The drawbar itself is provided with a plurality of longitudinally disposed slots to increase the adjustable possibilities in connecting it to the mounting plates.

Figs. 1 and 2 show the drawbar device equipped with a drawbar ball for pulling the trailer in a forward direction, and equipped with abutment angle plates for pushing the trailer rearwardly while keeping the tongue aligned with the center line of the tractor vehicle, as more fully set out in my copending applications for U. S. Letters Patent to which reference has been made.

Referring to the drawings, drawbar 10 (Figs. 1 and 2), formed of an L-shaped angle piece having one flange adapted to be disposed in a vertical plane transversely behind the bumper and the other flange extending rearwardly in a horizontal plane, has a series of horizontally spaced slots 11, a hitching ball 12, secured to the mid-point thereof and two angle brackets 13 and 14 spaced to either side of the ball to receive the ends 15 and 16 of the triangle frame 17.

Mounting plates 19 and 20 (Figs. 1, 2, 3 and 4) are each provided with a plurality of vertically aligned spaced bolt holes 25 to attach the plates to the bumper, and a plurality of horizontally aligned spaced bolt holes 22 by which the drawbar is attached. The right plate 20 is curved in a rearward offset 20a as it projects toward the longitudinal center line of the tractor vehicle, and the left plate 19 is curved in the same manner as at 19a to achieve the same result, the purpose of said offsets being to provide a clearance for the normal rearward curvature found in most rear bumpers, so that the drawbar will not interfere with the mid-portion of the bumper when attached to the plates.

As shown in Fig. 4, the horizontal bolt holes 22 of the mounting plates are arranged in spaced pairs, one hole of each selected pair receiving a bolt 23 (Fig. 2) which has been passed through a selected one of two adjacent slots in the drawbar, such selection being made so as to balance the mounting of the two ends if it is desired to center the ball 12 at the mid-point of the tractor vehicle.

In attaching the mounting plates to the bumper I provide two hollow mounting blocks 27 each having a bolt hole 28 and being provided with a V surface 31 to rest against the vertically curved surface found in most bumpers. One of these mounting blocks in position is shown in Fig. 3, with the bolt 26 passed through the middle hole 25 of the mounting plate, through hole 28 of the mounting block and a hole 29 in the bumper. In the event the mounting plate may be bolted directly to the bumper with the desired firmness, the mounting blocks may be dispensed with.

It will be apparent that the slots 11 in the drawbar by reason of their length in relation to the spacing of the pairs of holes 22 in mounting plates 21 give a high degree of adjustability in a horizontal direction. The three holes 25 in the mounting plates give sufficient adjustability in that direction, such holes being spaced about three-quarters of an inch apart on centers. If more adjustment is needed, larger plates with more holes may be used. The drawbar, also, may be supplied in extended lengths to meet unusual dimensions of the tractor vehicle and bumper.

Thus, the drawbar of my invention may be mounted on bumpers which have the bolt holes spaced varying distances apart, and by means of the vertical adjusting means compensation may be made for variations in the height of the different bumpers.

While the form of the structure herein shown and described is admirably adapted to fulfill the stated objects of the invention, it is not intended to confine the invention to the embodiment shown as it is capable of various embodiments all coming within the scope of the claims which follow.

Having thus described my invention, what I claim as new and useful and desire to secure by Letters Patent, is:

1. A drawbar and mounting therefor adapted to be transversely attached to the rear horizontal bumper of a tractor vehicle and selectively adjustable horizontally and vertically with respect to the bumper so that a hitch means on the drawbar may be centered with the longitudinal center line of the tractor vehicle and at a selected height above road level, including, in combination, a drawbar having a centrally located hitch means and a series of horizontally disposed slots spaced on either side of the hitch means; and a mounting plate for each series of slots, each plate having a plurality of holes by which a plate may be selectively attached to the drawbar, and said plates each having at right angles to the holes a second row of holes by which the plate may be attached to the bumper, whereby the hitch means may be centrally located with respect to the longitudinal center line of the tractor vehicle at a selected height above the road.

2. A drawbar and mounting therefor adapted to be transversely attached to the rear horizontal bumper of a tractor vehicle and selectively adjustable horizontally and vertically with respect to the bumper so that a hitch means on the drawbar may be entered with the horizontal center line of the tractor vehicle and at a selected height above road level, including, in combination, a drawbar having a centrally located hitch means and a series of horizontally disposed slots spaced on either side of the hitch means; a mounting plate for each series of slots, each plate having a plurality of holes by which it may be selectively attached to the drawbar, said plates each having at right angles to the holes a second row of holes; and a block for each plate and formed to fit between the plate and the bumper for rearwardly spacing each such plate from said bumper, said blocks and plates being attachable to said bumper by the last-mentioned row of holes, whereby the hitch means may be centrally located with respect to the longitudinal center line of the tractor vehicle at a selected height above the road, and at a distance spaced rearwardly from the bumper.

3. A drawbar and mounting therefor adapted to be transversely attached to the rear horizontal bumper of a tractor vehicle and selectively adjustable horizontally and vertically with respect to the bumper so that a hitch means on the drawbar may be centered with the longitudinal center line of the tractor vehicle and at a selected height above road level, including, in combination, a drawbar having a centrally located ball hitch and a series of horizontally disposed slots regularly spaced in the drawbar on either side of the ball hitch; and a mounting plate for each series of slots, each plate having a plurality of holes by which it may be selectively attached to the drawbar, and said plates each having at right angles to the holes a second row of holes by which it may be attached to the bumper, whereby the ball hitch may be centrally located with respect to the longitudinal center line of the tractor vehicle at a selected height above the road.

4. In a horizontal drawbar device selectively adjustable for transverse attachment to a tractor vehicle having a rear horizontal bumper, the combination of a drawbar having a centrally located ball hitch and abutment members spaced on either side of the hitch, and having a series of horizontally disposed slots spaced on either side of the ball hitch; and a mounting plate for each series of slots, each plate having a first plurality of holes by which it may be selectively attached to the drawbar by means of bolts, and said plates each having at right angles to the holes a second plurality of holes at right angles to the first plurality by which the plate may be attached to the bumper by bolts, whereby the ball hitch and abutment members may be centrally located with respect to the longitudinal center line of the tractor vehicle at a selected height above the road.

5. In a horizontal drawbar device selectively adjustable for attachment to a tractor vehicle having a rear horizontal bumper curved about the rear of said tractor vehicle, the combination of a drawbar having a centrally located hitch means and a series of horizontally disposed slots on each side of the hitch means; and a mounting plate for each series of slots, each plate having a first plurality of holes by which a plate may be selectively attached to the drawbar, said plates each having an offset portion, and having in said offset portion a second plurality of spaced holes disposed in a line at right angles to the first plurality by which the plate may be attached adjustably to the bumper, whereby the drawbar may be adjustably attached to bumpers so as to cause the hitch means to be centrally located with respect to the longitudinal center line of the tractor vehicle at a selected height above the road, and a distance behind the bumper.

6. A device for attachment to a rearwardly curved rear bumper of a tractor vehicle to which plate one end of a horizontally disposed drawbar may be attached without said drawbar interfering with the mid-portion of the bumper caused by said curvature, including, in combination, a mounting plate having a first plurality of openings in spaced alignment and a second plurality of openings in alignment at right angles to said first openings, and said plate being offset on a line parallel to one of said rows of holes and between said rows of holes.

7. In a drawbar device for hitching a trailer to the transverse horizontal bumper of a tractor vehicle, the combination of an L-shaped drawbar angle piece, one flange thereof having a hitching means thereon and the other flange having a series of spaced slots piercing it, said slotted flange being adapted to be placed in a vertical plane behind the bumper and so the other flange extends horizontally toward the rear; and a plate having two series of holes therein, the series of holes each forming a straight line and the lines on which said holes lie, if extended being at right angles to one another, whereby the drawbar may be bolted adjustably to the plates and the plates to the bumper by means of selecting the holes through which the bolts are to be placed, so that the hitching means may be centered transversely with the longitudinal center line of the tractor at a selected height above the road.

8. The device of claim 7 in which the plates each have an offset between the two lines of holes so the drawbar attached portion of the plates when attached to a bumper is spaced away therefrom.

9. The device of claim 7 in combination with a spacing block located between each plate and the bumper, each spacing block surrounding the bolt fastening the associated plate to the bumper.

10. The device of claim 7, adapted to cooperate with a bumper curved transversely rearwardly across the rear of a vehicle and curved vertically rearwardly, having in combination therewith a spacing block between each plate and the bumper, each surrounding the bolt fastening the plate to the bumper, said block having a V-shaped trough cut therein with the base of the trough extending horizontally, so that it will not turn upon the bolt when held fast to the bumper.

11. A drawbar and mounting therefor adapted to be transversely attached to the rear horizontal bumper of a tractor vehicle and selectively adjustable horizontally and vertically with respect to the bumper so that a hitch means on the drawbar may be centered with the longitudinal center line of the tractor vehicle and at a selected height above road level, including, in combination, a drawbar having a centrally located hitch means and a series of horizontally disposed elongated slots spaced on either side of the hitch means; and a mounting plate for each series of slots, each plate having a plurality of holes spaced so that a pair of bolts piercing a selected pair of said holes may be positioned on each end of a selected slot or one bolt in each of two selected slots to attach a plate to the drawbar, and said plates each having at right angles to the holes a second row of holes by which the plate may be bolted to the bumper through a selected one of said second holes, whereby the hitch means may be centrally located with respect to the longitudinal center line of the tractor vehicle at a selected height above the road.

ETHAN W. VARS.

REFERENCES CITED

The following references are of record in the file of this patent:

UNITED STATES PATENTS

| Number | Name | Date |
| --- | --- | --- |
| 1,739,456 | Hansen | Dec. 10, 1929 |
| 2,306,007 | Thorp | Dec. 22, 1942 |
| 2,360,643 | Bixel | Oct. 17, 1944 |
| 2,408,531 | Riemann et al. | Oct. 1, 1946 |